Figure 6:
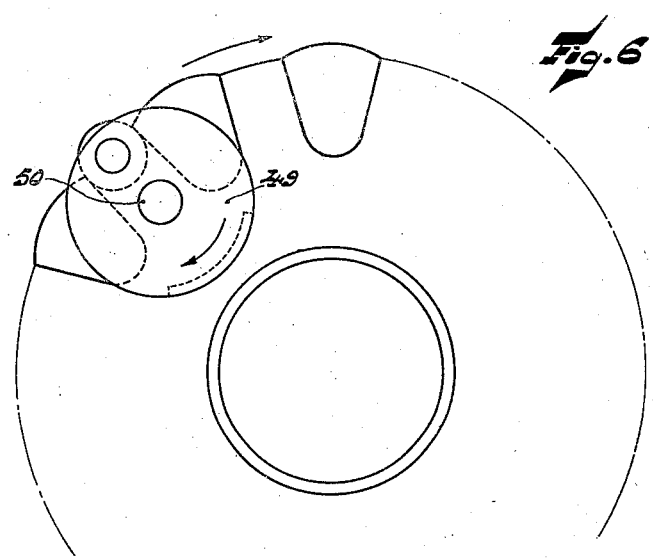

April 4, 1939.   P. J. SCHOONENBERG ET AL   2,153,485
AUTOMATIC GLASS BLOWING MACHINE
Filed Sept. 22, 1934   3 Sheets-Sheet 1
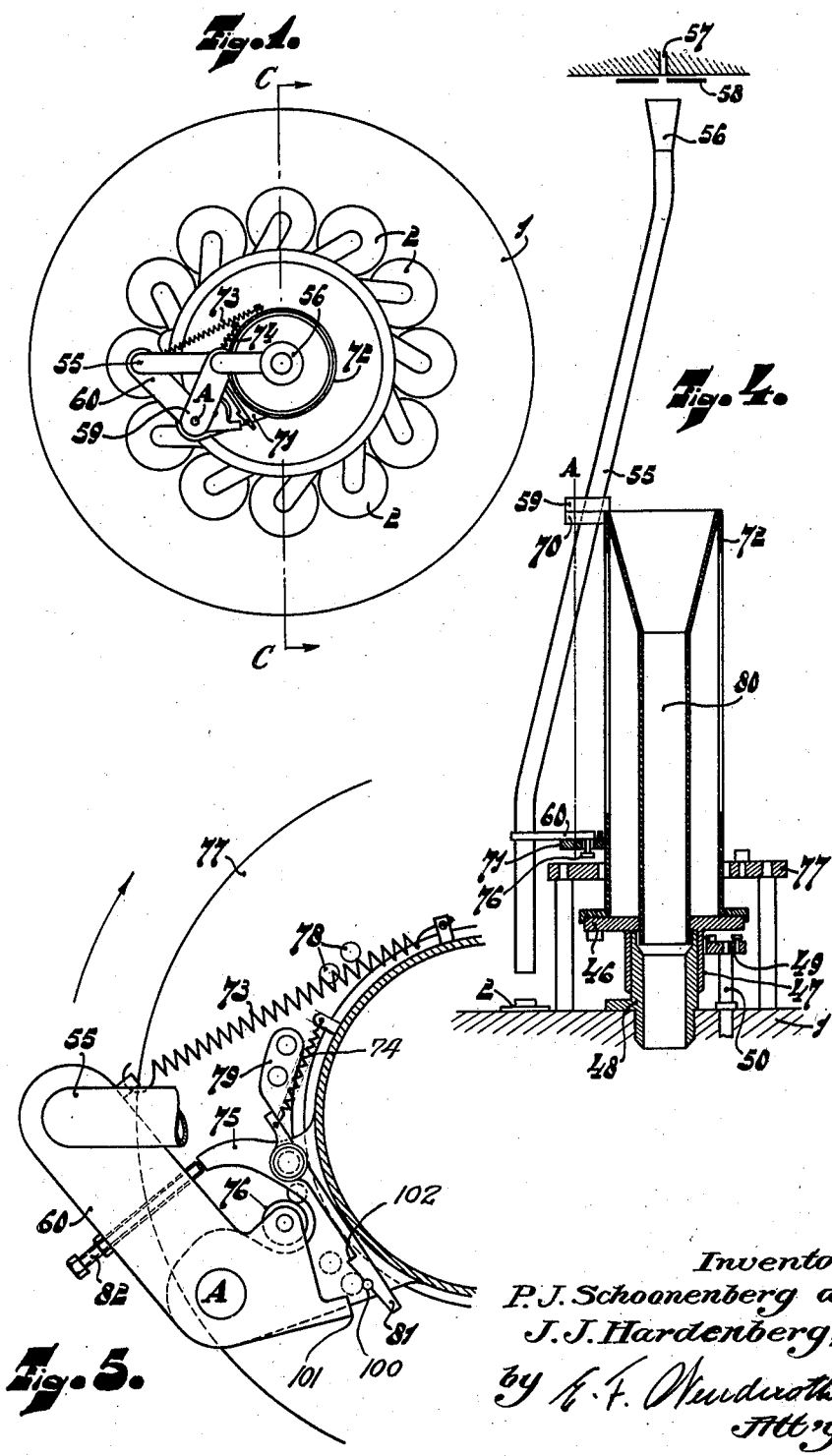
Inventors:
P. J. Schoonenberg and
J. J. Hardenberg,
by their Attorney April 4, 1939.  P. J. SCHOONENBERG ET AL  2,153,485
AUTOMATIC GLASS BLOWING MACHINE
Filed Sept. 22, 1934   3 Sheets-Sheet 2
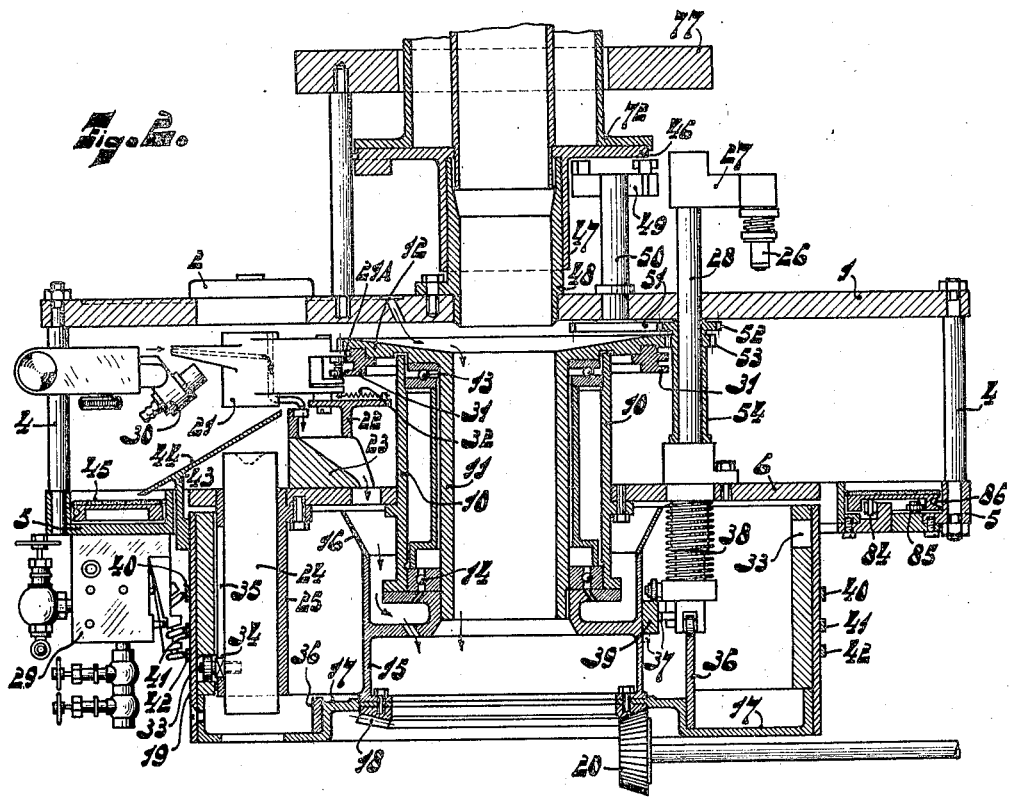
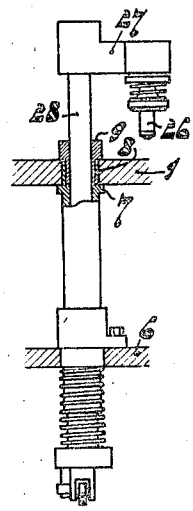
Inventors:
P. J. Schoonenberg and
J. J. Hardenberg,
by [signature]
Att'y.

April 4, 1939.    P. J. SCHOONENBERG ET AL    2,153,485
AUTOMATIC GLASS BLOWING MACHINE
Filed Sept. 22, 1934    3 Sheets-Sheet 3

Inventors:
P. J. Schoonenberg and
J. J. Hardenberg,
by E. F. Wenzel
Att'y.

Patented Apr. 4, 1939

2,153,485

UNITED STATES PATENT OFFICE 2,153,485

AUTOMATIC GLASS BLOWING MACHINE

Pancras J. Schoonenberg and Jan Jesayas Hardenberg, Eindhoven, Netherlands, assignors to N. V. Maatschappij tot Exploitatie van Uitvindingen, Rotterdam, Netherlands Application September 22, 1934, Serial No. 745,156
In Germany September 26, 1933

2 Claims. (Cl. 49—5)

This invention relates to an automatic glass blowing machine which is supplied from a fusion container.

Although various automatic glass blowing apparatus, for example, for the manufacture of bottles, bulbs for incandescent lamps, etc., are already known, all these apparatus have the property of only enabling the manufacture of bodies requiring a fairly large supply of glass. Indeed, in the construction of automatic glass blowing machines it has been ascertained that when very small quantities of glass are required for a body to be produced very great difficulties ensue. It has been found that when a container is used for the fusion, it is impossible to reduce at will the quantity of glass to be delivered in a given unit of time, but on the contrary a given speed of the glass through the supply port must be maintained and it is also impossible to reduce at will the section of the supply port for regular operation. If the speed of the glass through the supply port becomes too low, an irregular supply is caused by stagnation of the glass in front of the port, and the temperature of the glass portion severed at the supply port is in addition too low and irregular.

The use of a fusion container for the supply of an automatic glass blowing machine also implies that the machine must have a given minimum consumption of glass. A machine for producing very small glass bodies must therefore be a high output machine.

A further difficulty is the rapid cooling of the small portion of glass delivered which can only be obviated to a slight extent by a possibly quick operation and a minimum conveyance of the glass body.

The machine according to the invention comprises a plurality of units which are driven from a central point and each of which comprises a collar mould with accessory preliminary pressing, blowing and expelling aggregate which cooperate in such manner that the glass portion remains stationary during its entire manipulation. The units may be arranged in a circle, consequently in an annular shape. In one embodiment of the invention the supply port is arranged vertically above the center of the circle upon which the units are arranged, above the supply funnel and also above a central tube which serves for carrying away shrinkage and refrigerating water. The word "shrinkage" as used hereinafter is to be understood to include, for example, portions of glass that are not permitted to reach the next free unit; this unit being placed out of operation.

For charging the units use is made of a filling tube which has one funnel-shaped end for receiving the glass from the supply port and has its other end located slightly above the plate that carries the units. The tube is intermittently operated in such a manner that it remains stationary only above that unit which is ready to be charged. The well known severing device is located below the supply port of the fusion container and is so actuated with respect to the movement of the filling tube that the glass portion arrives in the head mould at the proper moment.

The filling tube is preferably provided with a device adapted to move the funnel end of the tube away from the supply port so that the next glass portion falls outside the funnel and finds its way into the central outlet tube. This device permits some of the units to be thrown out.

The intermittent movement of the filling tube is preferably brought about by a Geneva motion device of particular form. In order that the portion of glass may always arrive in the head mould in the correct position, it is necessary for the filling tube to be perfectly stationary during charging. The drive by a Geneva motion device is especially suitable for such a movement. We have found that the well known form using an external gear is not suitable in the present case in which a high gearing ratio is required, because the filling tube will not be securely held in each of its positions and there will be considerable wear. Therefore, we prefer to use an internal gear construction which, as will appear from the following detailed description, insures satisfactory locking and very little wear.

All the members to be actuated are preferably driven from a central point by a central drum driven by an electric motor. The drum is journalled on ball bearings and is provided with a rim gear and several cam tracks.

In order to ensure a satisfactory operation and alignment of the movable parts, the entire apparatus is preferably suspended from the ceiling so as to be free from oscillations. The machine according to the invention permits of easily obtaining an output of about 3000 pieces per hour.

Figure 7:
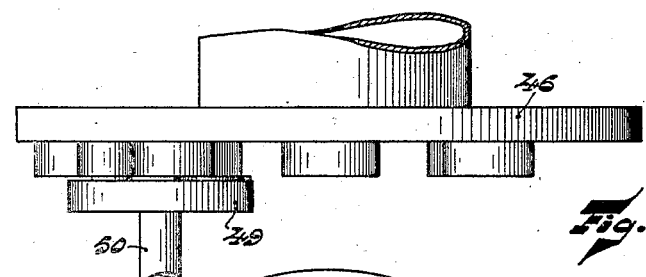
Figure 8:
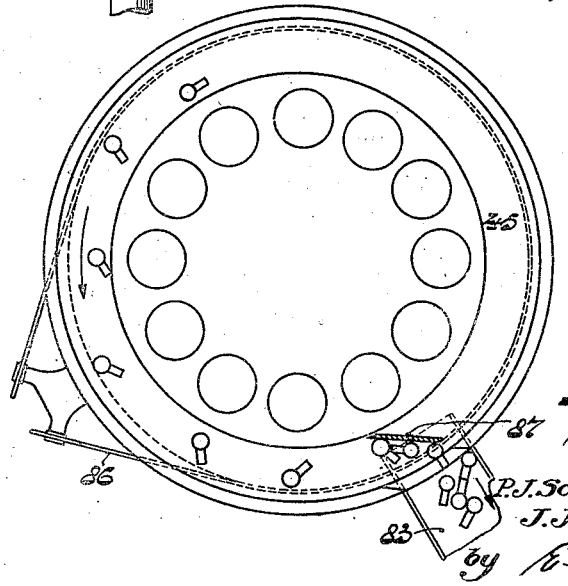

In order that the invention may be clearly understood and readily carried into effect one form of construction of the machine for manufacturing small bulbs for incandescent lamps according to the invention will now be described more fully with reference to the accompanying drawings, in which Figure 1 is a plan view of a machine, according to the invention, Figure 2 is a sectional view taken on the line C—C of Fig. 1 with some of the upper parts removed and with one of the plungers turned into the plane of the section for the sake of clearness, Figure 3 is a partly sectionized detail view of a plunger, Figure 4 is a partly sectionized side view of the upper portion of the machine and shows the arrangement of the filling tube, Figure 5 is a detailed plan view of the device for throwing out the filling tube, Figure 6 is a bottom view of the Geneva motion gear for rotating the filling tube, Figure 7 is a side view of Fig. 6, Figure 8 is a plan view of a portion of the machine and shows the conveyer belt for removing the finished bulbs.

Figure 1 shows a stationary annular table 1 on which are arranged in a circle a plurality of units 2; in the drawing twelve units being shown. Above each of the units is shown an arm 27 of the plunger mechanism, to be more fully described hereinafter. Referring to Figure 2, the table 1 has suspended from it by means of bolts a concentric ring 5. The table 1 has in addition a plate 6 secured to it by bushings 7 (Figure 3) which bushings serve for guiding plunger rods 28. The bushings 7 are secured to the plate 6 by means of bolts and at their upper ends they are each provided with a helical thread 8. Nuts 9 clamp the bushing to the table 1. The plate 6 (Figure 2) has centrally secured to it by means of bolts a bushing 10 carrying the bearings for the rotary central portion of the machine. Thus the table 1, units 2, ring 5, plate 6, bushing 10, as well as plate 77 and bushing 48 (later to be described) are secured together to form a stationary unit. In Figure 2 the rotary central portion of the machine is indicated by the use of cross-section lines which are closer together than the cross-section lines of the stationary portions of the machine. This central portion includes the cam tracks 33, 36, 39, 40, 41, and 42 which serve a purpose later to be described. One end of the tubular body 11 is constructed as a spur gear wheel 12 and is journalled in ball bearings 13 and 14. The tubular body 11 is connected to a body 15, a funnel 16, a disc 17, a gear wheel 18 and a drum 19. Thus the central rotating portion consists of the tubular body 11, body 15, funnel 16, disc 17, gear wheel 18, double cam track 31, and drum 19 with the cam tracks attached thereto; these parts being secured together to form an aggregate which is carried on the bearings 13 and 14 and is driven by gearing 20—18 from an electric motor (not shown).

The head moulds 2 are arranged in the stationary table 1, and the blowing moulds 21 (only one being shown in Fig. 2) are arranged on the stationary plate 6 by the intermediary brackets 22 and 23. A pressing mould 24 is slidably mounted within a bushing 25 which is also secured to the plate 6. The plungers 26 (of which only one is shown in Figure 2) are connected to rods 28 by means of arms 27. The plungers 26 are adapted to be rotated about the axes of rods 28 and to be moved in the axial direction of rods 28. Reference numeral 29 designates the aggregate for regulating the mixture of gas and air for the burners 30 and the puffing and blowing air.

The supply of the air and gas mixture to burners 30 as well as the supply of the puffing air is controlled by suitable valves forming part of the aggregate 29 and operated by ring-shaped cams 40, 41 and 42 mounted on the outer surface of drum 19. Cam 40 controls the flow of puffing air, whereas cams 41 and 42 control the air-gas mixture for burners 30. The puffing air passes from the aggregate 29 to the blowing molds 21 and the air-gas mixture passes from the aggregate 29 to the burners 30 through suitable conduits (not shown). The air and gas is supplied to aggregate 29 under pressure from suitable supply sources (not shown).

Each of the blowing moulds 21 is formed by two parts which are joined together as the blades of a pair of scissors. Each of these parts is provided with a roller 21A, the rollers riding upon a double cam track 31 secured to the tubular body 11. The pair of scissors are closed by two springs 32 (only one being shown) and the cam track 31 serves to open the two parts of the mould at the proper moment and the pressing mould 24 is moved by a cam track 33. The pressing mould is prevented from rotating by a member of rectangular cross section 34 which is rigidly connected to the pressing mould and which is adapted to slide in a slot 35 of the bushing 25. Pressing plunger 26 is moved vertically by a cam track 36, and is rotated about the axis of rod 28 by a lug 37 cooperating with the side of cam 39. As the helical spring 38 does not exert sufficient force for the pressing operation, a second lug (not shown) is provided to move the plunger downward during the pressing operation.

Preferably, one regulating apparatus 29 is provided for each unit. The air and gas pipes are not shown in Figure 2.

Fixed to drum 19 by a bracket 43 is a plate 44 which has about the width of a unit and conducts the finished bulbs to a conveyer disc 45 shown in greater detail in Figure 8.

Figure 2 shows in addition the gearing for the intermittent rotation of the filling tube, which gearing is shown more clearly in Figure 4. Referring to Figure 4, the large wheel 46 of the Geneva motion device (see Figs. 6 and 7) is provided with an annular extension 47 which is adapted to slide on a bushing 48 fixed by bolts to the table 1. The small wheel 49 of the Geneva motion device is keyed to a shaft 50 on the end of which is secured a gear 51 driven by gear wheels 52 and 53 from the wheel 12 (see Fig. 2). The gear wheels 52 and 53 form part of a bushing 54 which is adapted to rotate on the rod 28. It should be noted that only one of the rods 28 is provided with a bushing 54 and gears 52 and 53; the remaining rods being provided with plain bushings 7 as shown in Fig. 3.

As shown in Figure 4, the filling tube 55 is provided with a funnel-shaped mouth 56 located below the supply port 57. The severing device is designated by 58. The filling tube is adapted to be rotated about the axis A—A and is supported by means of two arms 59 and 60 from projections 70 and 71 respectively of the cylinder 72. Helical spring 73 and a stop 75 (see Figures 1 and 5) hold the tube in its operative position.

Figure 5 shows in greater detail the device for throwing out the filling tube. The arm 60, to which the filling tube 55 is secured, is constructed in a characteristic manner and carries a roller 76 which extends beyond a projection 71 of the cylinder 72 (Figure 4). A stationary annular disc 77 supported from table 1 has formed in it pairs of apertures 78 (one pair of apertures being provided for each unit) in which a projecting lug 79 may be inserted. When a lug 79 is inserted at a particular unit, the roller 76 is deflected and the filling tube 55 is thus rotated about the axis A—A to such an extent that the portion of glass does not enter the funnel 56 but falls past the funnel 56 and into the shrinkage tube 80. Thus, if one of the units is defective for some reason, a projecting lug 79 is inserted in the apertures 78 corresponding to that unit, whereby the filling tube is rotated about the axis A—A to prevent delivery of a glass charge to the unit. The entire apparatus can be thrown out of operation by means of a pawl 81 which is adapted to hold the arm 60 in a swung-out position. Pawl 81 is held in the position shown by means of a removable pin 100, and upon the removal of this pin the pawl is rotated clockwise by a tension spring 74. If the arm 60 is then rotated counterclockwise a projection 101 thereof will engage a notch 102 in pawl 81 and the tube 55 will be held in this position. A set screw 82 serves for the proper adjustment of the tube 55.

Referring now to Figure 2, cooling water supplied from a suitable source (not shown) passes in the direction of the arrows through passage-ways (shown in dotted lines) in the blowing mold 21, and then passes into the central bore of body 15.

As shown in Figures 2 and 8, the conveyor disc 45 is carried by rollers 84 and 85 and is rotated by a belt 86 driven by a motor (not shown). An inclined plate 87 arranged slightly above disc 45 serves to transfer the glass bodies to a conveyor belt 83.

The machine according to the invention operates in the following manner: The molten glass leaves the fusion container through the aperture 57, and a suitable glass portion is cut off by means of the severing device 58. This cut-off glass portion then falls either into the funnel-shaped mouth 56 of the filling tube or, if the filling tube is turned away from a particular unit, the glass portion falls into the funnel 72 of the shrinkage tube 80. In the latter case the particular unit remains out of service.

In the first case the glass portion passes through the filling tube 55 into that stationary head mold 2 which is ready to be charged. The glass portion is retained at the edge of the head mold and remains at this point during the further working thereof.

The filling tube is then turned through a definite angle by means of the Geneva device; the wheel 46 of which is intermittently moved by the cam provided on the continuously-rotated wheel 49. The wheel 49 is continuously rotated through shaft 50, gears 51, 52, and 53 by the spur wheel 12, which is mounted on the rotating central portion of the machine. This central rotating portion, as has been stated above, is continuously rotated through gears 18 and 20 from a motor, not shown. Thus the table 1, plate 6, and plate 77 are stationary, whereas the drums 15, 17, and 11, which carry the various cam tracks are continuously rotated.

Due to the resulting rotation of the Geneva wheels the filling tube is moved to the next unit which is ready to be charged. It will thus be seen that all the active head molds each contain a glass portion and at a given moment each of the glass portions are in a different stage of the process.

As has been above set forth, the rotary central portion comprises several cam tracks which, in conjunction with the cams, operate various members. As a rule the rollers cooperating with the cam tracks are stationary so that the switching in of the members is effected by the rotating cam tracks, which may be provided with profile variations.

When the glass portion has entered the head mold the first step is the pressing operation, which is carried out by the lifting of the pressing mold 24 by the cam track 33 and the downward movement of pressing plunger 26. The latter movement is effected by means of the cam track 36 in conjunction with the spring 38; plunger 26 being turned by the cam 39.

After the pressing operation, the glass portion is subjected to a puffing operation. The air for the puffing operation is supplied by the aggregate 29, which for this operation is controlled by the cam track 40. After the puffing operation the glass object is heated by the burner 30, to which an air mixture is also supplied by the device 29. For this purpose the device 29 is operated by the cam tracks 41 and 42.

After the mass of glass has been heated the two parts of the blowing mold 21 are moved together by the springs 32 and by the action of the cam tracks 31 upon rollers 21A, so that both parts engage the mass of glass.

The glass mass is then blown into a bulb by means of the blowing air, and the bulb is ejected downward from the mold.

The bulb falls upon the plate 44—which is rotated with the central portion of the machine—and slides down upon the rotating conveyor discs 45—from which it is removed by the plate 87. The unit from which the bulb has been ejected is then ready to be recharged with a glass portion.

What we claim is:

1. In an automatic non-rotary glass-blowing machine for manufacturing hollow glass bodies, a plurality of units arranged in a circle around the vertical axis of the machine, each of said units comprising a stationary head mold and means for the preliminary-pressing, and ejecting of the bodies, a fusion container for the glass having a supply port, a central tube located beneath said supply port to carry away the shrinkage, a filling tube to convey charges of molten glass from said supply port to said units, one end of said tube being normally beneath said supply port, means including a hollow member to stepwise rotate said filling tube about said vertical axis to consecutively deliver charges to said units and to positively lock said tube in each delivery position for a predetermined time, means to actuate said first means including a ring-shaped cam carried by said hollow member, and means to prevent the delivery of a charge to any desired unit comprising a device to rotate said filling tube about a vertical axis passing through the filling tube to thereby allow the charge to drop into said central tube.

2. In an automatic non-rotating glass-blowing machine, a plurality of glass forming units arranged in a circle about the vertical axis of the machine and each comprising a stationary blow mold, said mold comprising two pivoted portions, a roller mounted on one end of each of said portions, and resilient members holding said portions in their closed position, and means to open said portions in proper sequence comprising a hollow member constantly rotating about said vertical axis, and a ring-shaped cam carried by said member and cooperating with said rollers.

PANCRAS J. SCHOONENBERG.
JAN JESAYAS HARDENBERG.